United States Patent Office 3,503,661
Patented Mar. 31, 1970

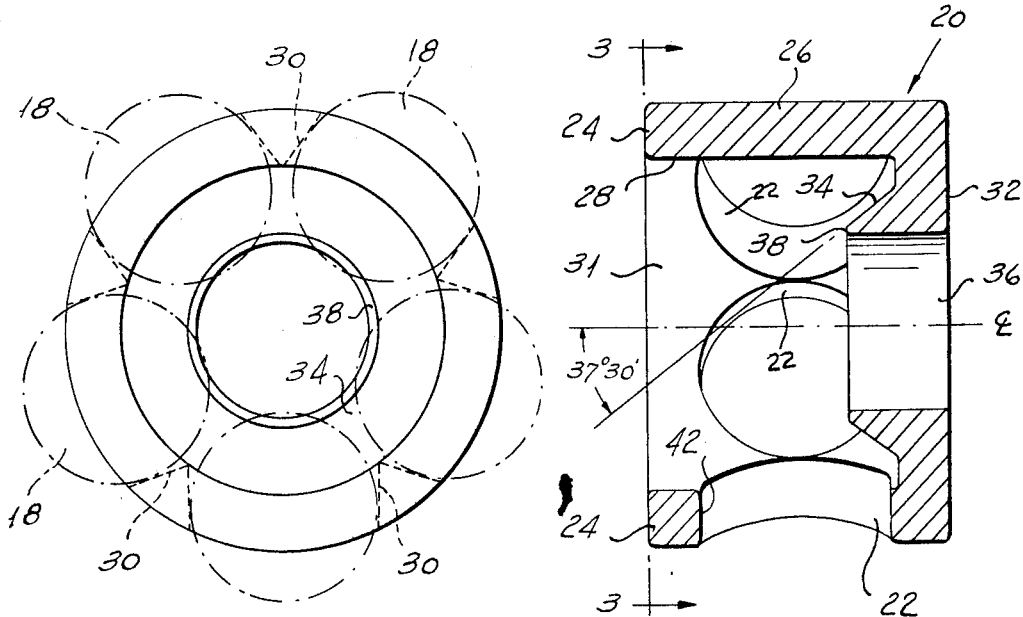
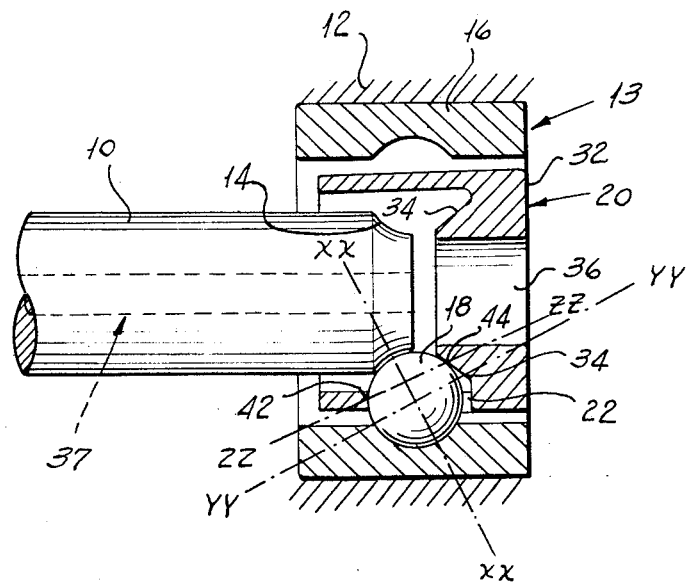

3,503,661
BALL RETAINER
William E. Taylor, Oakland, N.J., and Guy F. Ciacco, Bronx, N.Y., assignors to The Bendix Corporation, a corporation of Delaware
Filed Jan. 25, 1967, Ser. No. 611,702
Int. Cl. F16c 33/37, 35/58
U.S. Cl. 308—193             6 Claims

ABSTRACT OF THE DISCLOSURE

This invention relates to a high accuracy ball bearing of the kind used in gyroscopes having a cylindrical ball retainer with pockets for receiving and spacing the balls. The retainer has a truncated axial cone engaging the balls for accurately centering the retainer about the axis of rotation.

BACKGROUND OF THE INVENTION

Field of the invention

The invention relates to highly precise ball bearings and more particularly to antifriction radial ball cages and ball retainers therefor.

Prior art

Highly accurate instruments such as gyroscopes require end play of the gyroscope wheel to be limited to less than 1 micro inch since greater end play of the wheel renders the gyroscope inaccurate. Further, a ball bearing of the kind used in gyroscopes must be stable during operation and repeat performance upon successive operations. Ball retainers of the punched metal type are not satisfactory since such retainers are often formed by a bending operation with punched out holes for ball pockets forming a rather crude structure which is only satisfactory in performance for heavy motor shafts, etc. Heretofore, ball retainers of a phenolic or similar hard or porous laminated plastic have been utilized to maintain an oil film in the ball pockets because of the material porosity. The retainers have been constructed with various shaped ball pockets to prevent the retainers from contacting the races of the bearing, but the walls of the ball pockets made annular surface contact with the balls which created excessive friction between the balls and retainers with resulting increases in temperature causing deformations of the retainers. Because of the peculiar shape of the retainer pockets, the pockets once formed, could be further machined only with substantial difficulty and expense.

The present invention relates to a porous laminated plastic or phenolic retainer having cylindrical ball pockets and an axially extending truncated cone positioned adjacent the pockets and engaging the balls to prevent the retainer from contacting the races of the bearing. This arrangement eliminates the need for the peculiar shaped pockets used heretofore so that the pockets may be inexpensively machined after formation to meet the immediate operational requirements under which the retainer is used. Further, the cone may be reshaped by a simple machining operation as required for best practical results. The cone maintains single point contact with each ball and is of sufficient thickness to be rigid so as to aid in preventing radial deformation of the retainer when subjected to high shaft speeds, temperature variations, etc. Further, the retainer of the present invention is temperature compensating, that is, if due to temperature the outer diameter of the retainer is slightly increased causing radial movement of the pockets with respect to the balls, then the cone diameter also increases causing the balls in contact with the cone to be forced radially outward to original contact position with respect to the pockets.

SUMMARY

One object of this invention is to provide a novel highly precise ball bearing having a ball retainer with low friction characteristics.

A further object of this invention is to provide a novel ball retainer having an axially extending truncated cone engaging each ball at a single point to prevent the retainer from contacting the bearing races.

A further object of this invention is to provide a novel ball retainer having a truncated cone of sufficient rigidity to aid in preventing deformation of the retainer.

A further object is to provide a novel retainer having cylindrical pockets and a truncated cone all of which may be readily machined after formation to meet the operational requirements under which the retainer is used.

A further object of this invention is to provide a novel ball bearing which is stable during operation, has predetermined operational characteristics over extended periods of operation and repeats performance upon successive operations.

It is a further object of this invention to provide a highly precise novel ball bearing which limits end play of a shaft rotating therein to relatively small tolerances.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

DESCRIPTION OF THE DRAWINGS

FIGURE 1 is a cross-sectional view of a ball bearing embodying the present invention rotatably supporting a shaft.

FIGURE 2 is a cross-sectional view similar to FIGURE 1 of the novel retainer of the present invention.

FIGURE 3 is an axial view of the novel retainer and balls.

DESCRIPTION OF THE INVENTION

Referring particularly to FIGURE 1 a shaft 10 of a gyro or other precision instrument is supported for rotation within a frame 12 by a novel ball bearing 13 constructed according to the invention. The ball bearing comprises an inner race 14 formed by a concave surface on one end of shaft 10, an outer race 16 formed by a concave surface on frame 12, a plurality of balls 18 riding on the inner and outer races and a novel retainer 20 for spacing and separating the balls. The shaft 10, of course, is supported at the opposite end by a similar ball bearing.

Referring in particular to FIGURES 1 and 2, the novel ball retainer 20 preferably is made of laminated plastic, such as phenolic and is provided with ball pockets 22 bored in a radial direction through an outer cylindrical portion 24 having outer and inner cylindrical surfaces 26 and 28. The pocket walls provide webs 30 between adjacent pockets 22. The retainer 20 has an axial recess 31 therein which receives the shaft 10.

One face 32 of retainer 20 extends radially in a plane transverse to the cylindrical surface 26. Another face 34 opposite face 32 is in the shape of a truncated cone concentric about the axis of the retainer. A hole 36 bored through the face portion 32 in the direction along the axis of the retainer defines a wall 38 with cone 34. The hole 36 permits access within retainer 20 to a passageway 37 in shaft 10, but it should be obvious that the hole 36 is not necessary and face portion 32 can be continuous.

The invention contemplates any number of balls and ball pockets 22 in retainer 20 and the retainer shown in the drawings is provided with five ball pockets 22.

As shown in FIGURE 1, the line X—X between the contact points of each ball 18 with inner race 14 and outer race 16 is at some predetermined small angle to a radial line extending from the retainer axis through the center of each ball 18 to preevnt axial shift or end play of shaft 10. Each ball 18 rotates in the asscated ball pocket 22 of retainer 20 about an axis Y—Y 90° from line X—X. Each ball 18 engages retainer 20 at only two points, at point 42 on the wall of the cylindrical pocket 22 and at another point 44 on cone portion 34. The center of each ball preferably is positioned in a plane midway between surfaces 26 and 28 of cylindrical portion 24 of retainer 20.

The slope of cone 34 may be designed so that a line Z—Z between contact points 42 and 44 is displaced from the axis of rotation Y—Y a suitable distance to provide for rolling contact between the balls and the retainer to rotate the retainer about its axis at the proper speed. The slope and axial length of the truncated cone 34 and the diameter of ball pockets 22 may be varied to attain favorable dynamic behavior including accurate ball location, good lubrication, bearing life, and reduction of the common resonant vibration condition known as squeal.

Cone 34 aids in the prevention of axial shift of shaft 10 under dynamic conditions. If one ball 18 tends to shift in a direction parallel to the shaft axis, retainer 20 is held in position by all the other balls 18 engaging the pockets at point 42 and cone 34 at point 44 and prevents the one ball from shifting.

Balls 18 engaging the cone 34 limit displacement of the retainer 20 in a radial direction to prohibit the retainer from contacting the outer and inner races.

Although only one embodiment of the invention has been illustrated and described, various changes in the form and relative arrangements of the parts, which will now appear to those skilled in the art may be made without departing from the scope of the invention.

What is claimed is:

1. In a ball bearing having an outer race and an inner race and balls rotating on the races and rotatably supporting a shaft, a retainer for separating the balls having:
   an outer portion concentric with the axis of the shaft;
   ball pockets in the outer portion receiving the balls therein; and
   a cone portion positioned inwardly of the pockets and the cone vertex axis being coaxial with the shaft axis;
   the cone portion being formed and arranged to engage the balls and prevent the retainer from engaging the races.

2. In a ball bearing having an outer race and an inner race and balls rotating on the races and rotatably supporting a shaft, a retainer for separating the balls having:
   an outer portion concentric with the axis of the shaft;
   ball pockets in the outer portion receiving the balls therein; and
   a cone portion extending inwardly from the outer portion and the cone vertex axis being coaxial with the shaft axis;
   the cone portion being formed and arranged to engage the balls and prevent the retainer from engaging the races;
   the ball pockets being cylindrical in shape and being of greater diameter than the balls and each of the balls engaging a wall of the ball pocket and the cone at points spaced from the axis of rotation of the ball to provide rolling contact between the balls and the retainer.

3. A ball bearing as defined in claim 2 in which each ball engages the associated ball pocket and each ball engages the cone at a single point.

4. A ball bearing as defined in claim 2 in which the engagement of the balls with the walls of the ball pockets is substantially midway between the inner and outer ends of the wall.

5. A ball bearing as defined in claim 1 in which the outer portion and the cone of the retainer are of sufficient rigidity to prevent flexing of the retainer, the balls engaging walls of the associated pockets and the cone for effectively preventing axial shift of the shaft within the ball bearing.

6. A ball bearing as defined in claim 1 wherein the retainer is made of a porous, laminated plastic material for lubrication purposes to provide low friction.

References Cited

UNITED STATES PATENTS

| 58,739 | 10/1866 | Durand et al. | 308—201 |
| 3,027,626 | 4/1962 | Murphy | 308—201 |

MARTIN P. SCHWADRON, Primary Examiner

U.S. Cl. X.R.

308—201